US007562260B2

(12) United States Patent
Mall

(10) Patent No.: US 7,562,260 B2
(45) Date of Patent: Jul. 14, 2009

(54) METHOD AND SYSTEM FOR PERFORMING RECOVERY OF A SINGLE-THREADED QUEUE

(75) Inventor: Michael G. Mall, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 11/397,842

(22) Filed: Apr. 4, 2006

(65) Prior Publication Data

US 2007/0234103 A1   Oct. 4, 2007

(51) Int. Cl.
*G06F 11/00* (2006.01)
(52) U.S. Cl. .............................. 714/47; 714/20; 714/48
(58) Field of Classification Search ..................... 714/5, 714/20, 41, 47, 48
See application file for complete search history.

(56) References Cited

U.S. PATENT DOCUMENTS

| | | | | |
|---|---|---|---|---|
| 5,265,229 A | * | 11/1993 | Sareen | 710/100 |
| 5,388,238 A | * | 2/1995 | McHarg et al. | 711/110 |
| 5,584,038 A | * | 12/1996 | Papworth et al. | 712/23 |
| 6,088,817 A | * | 7/2000 | Haulin | 714/42 |
| 6,658,596 B1 | * | 12/2003 | Owen et al. | 714/16 |
| 6,665,814 B2 | * | 12/2003 | Hobson et al. | 714/16 |
| 6,766,467 B1 | * | 7/2004 | Neal et al. | 714/5 |

OTHER PUBLICATIONS

Robert W. Floyd, "Floyd's Cycle-Finding Algorithm", http://en.wikipedia.org/wiki/Cycle detection. First published in "Non-deterministic Algorithms", Mar. 1967, pp. 636-644, J. Assoc. Computing.

* cited by examiner

*Primary Examiner*—Yolanda L Wilson
(74) *Attorney, Agent, or Firm*—Dillon & Yudell LLP

(57) ABSTRACT

A method, system and computer program product for performing recovery of a single-threaded queue are disclosed. The method includes scanning a set of elements of the single-threaded queue to detect a cycle containing a first element, and, in response to detecting the cycle, determining a size of the cycle in terms of a number of elements contained the cycle. A second element of the set of elements of the single-threaded queue is located, which second element is previous to the first element by a number of elements equivalent to the cycle. An element causing the cycle is located by performing a detailed element scan starting at the second element and the single-threaded queue is recovered by storing an end-of-queue value in a forward link of the element causing the cycle.

20 Claims, 2 Drawing Sheets

METHOD AND SYSTEM FOR PERFORMING RECOVERY OF A SINGLE-THREADED QUEUE

BACKGROUND OF THE INVENTION

1. Technical Field

The present invention relates in general to data processing and in particular to performing queue recovery. Still more particularly, the present invention relates to a system, method and computer program product for performing efficient recovery of single-threaded queues.

2. Description of the Related Art

The tortoise and hare (T/H) algorithm is a well known public algorithm for efficiently detecting cycles (circular loops) in a linked list (queue) of elements. However, the T/H algorithm can not identify the queue element that caused the cycle. The T/H algorithm only detects if there is a cycle and identifies an element in the cycle. The T/H algorithm can detect cycles in many arbitrary sequences, whether in data structures or generated on the fly, notably including those in graphs and pseudo-random sequences in O(1) space. Defining a function F: $f: S \mapsto S$ to be a pseudo-random function, with S a finite set of cardinality n, and define a sequence $a_i$ as: $a_{i+1}=f(a_i)$, such a sequence must cycle after at most n iterations of the pseudo-random function, because there are only n possible values for an element.

In the prior art, one way to find the length of the cycle is to store each element of the sequence and, at each iteration, look among all the stored elements for duplicates. This means that the storage requirement is $O(\mu+\lambda)$, where $\mu$ is the length of the cycle and $\lambda$ is the length of the tail (i.e. the part of the sequence that does not cycle). Note that if two elements of the sequence are found such that $a_i=a_j$ then $|i-j|$ must be a multiple of the cycle length, because of the definition of a cycling sequence: $a_{\lambda+m}=a_{\lambda+m+k\mu}$. The difference of the two indices that hold equal elements is $k\mu$, a multiple of the cycle length. The T/H cycle-finding algorithm finds such an equality by running two instances of the sequence in parallel, one twice as "fast" as the other; i.e., one instance undergoes two iterations while the other undergoes one. Then, when $a_m=a_{2m}$, any divisor of $2m-m=m$ might be the length of the cycle. If m is composite, one can let the algorithm continue running until it finds more values of m for which the above equality is true, and take the greatest common divisor of the m's. This way, the list of possible $\mu$'s can be trimmed.

The best performance this algorithm can give is $\lambda$ comparisons (with $\lambda>1$), because the "slow" sequence has to get at least to the beginning of the cycling part of the queue. The worst-case performance is $\lambda+\mu/2$ comparisons; the slow sequence cannot get more than halfway around the loop without meeting the fast sequence. The algorithm uses O(1) storage.

To usefully apply the T/H algorithm to queue recovery applications in computing, it is important to identify the element which caused the cycle when recovering a single linked queue. The recovery operation requires the ability to repair the queue by storing an end of queue value into the element causing the cycle. This operation removes the cycle and avoids losing any of the elements on the queue.

Some operating systems contain a service, which verifies and recovers single-threaded queues. Such a utility, within the prior art, contains an algorithm that finds the element causing the cycle. The utility performs this function by examining every element on the queue. For every element on the queue, the utility scans the list from the beginning to see if the list is circular. The utility performs this operation by checking to see if the element is found on the queue at a position count before the position count of the current element being examined. While this algorithm does find the element that causes the cycle, it consumes a large amount of CPU time and the CPU time required grows exponentially as the queue gets longer. Queue verification and repair can be a CPU, memory, and wall clock time intensive operation for very long queues. The amount of checking done by the element checker routine and amount of paging needed on pageable queues affects the amount of CPU resource and elapsed time required to verify a queue.

A more efficient method, system and computer program product to verify and recover a single-threaded queue are needed.

SUMMARY OF THE INVENTION

A method, system and computer program product for performing recovery of a single-threaded queue are disclosed. The method includes scanning a set of elements of the single-threaded queue to detect a cycle containing a first element, and, in response to detecting the cycle, determining a size of the cycle in terms of a number of elements contained the cycle. A second element of the set of elements of the single-threaded queue is located, which second element is previous to the first element by a number of elements equivalent to the cycle. An element causing the cycle is located by performing a detailed element scan starting at the second element and the single-threaded queue is recovered by storing an end-of-queue value in a forward link of the element causing the cycle.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for performing efficient recovery of a single-threaded queue. The present invention includes a queue verification and recovery utility that uses the tortoise and hare algorithm for detecting queue cycles and then uses information obtained from that algorithm to efficiently locate an element that caused the cycle. This approach provides a dramatic reduction in the amount of CPU time needed to perform queue verification and recovery.

Figure 1:
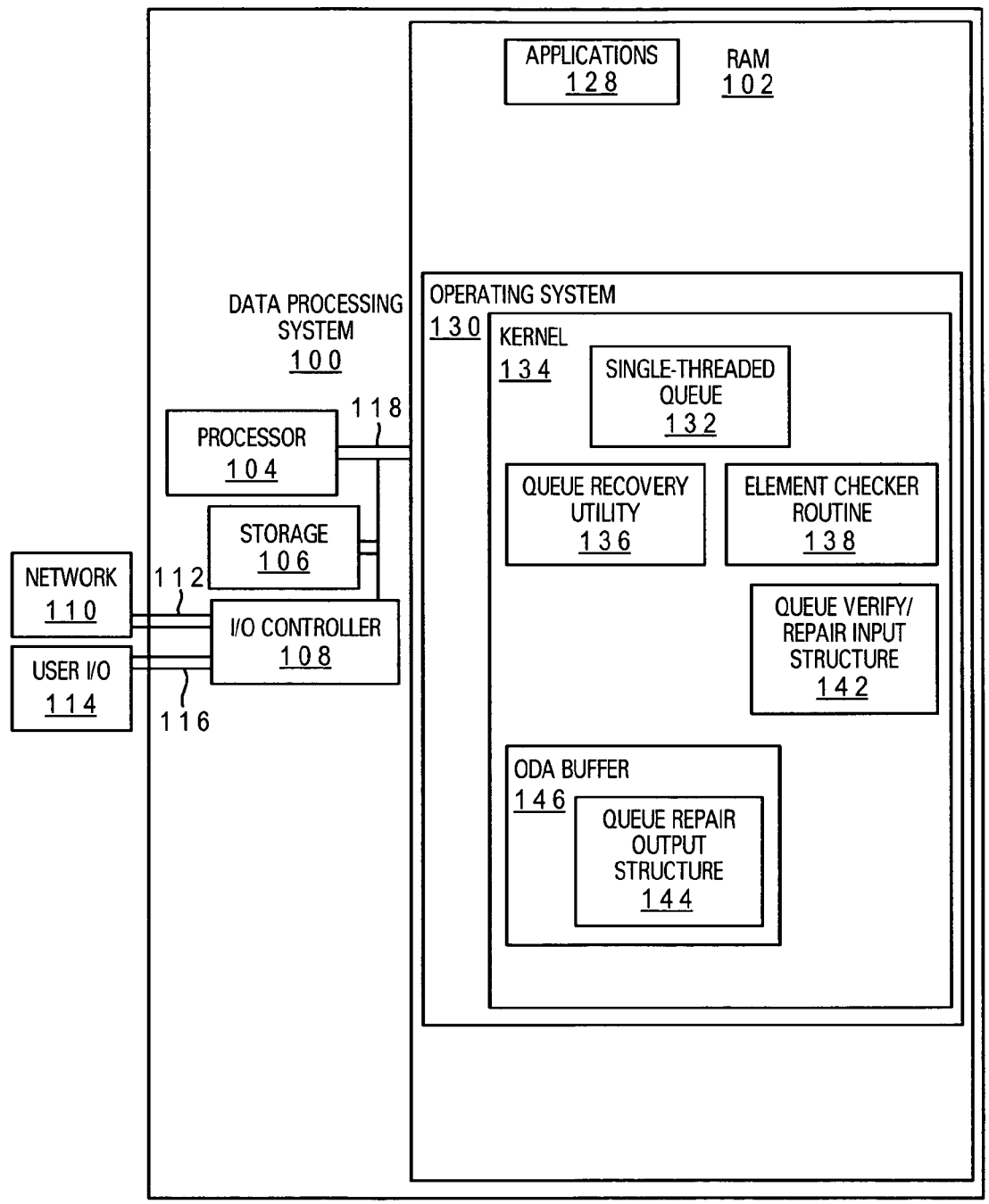
FIG. 1 depicts a block diagram of a general-purpose data processing system with which a preferred embodiment of the present invention of a method, system and computer program product for performing efficient recovery of a single-threaded queue is employed.

With reference now to the figures, and in particular with reference to FIG. 1, a block diagram of a general-purpose data processing system, in accordance with a preferred embodiment of the present invention, is depicted. Data processing system 100 contains a processing storage unit (e.g., RAM 102) and a processor 104. Data processing system 100 also includes non-volatile storage 106 such as a hard disk drive or other direct-access storage device. An Input/Output (I/O) controller 108 provides connectivity to a network 110 through a wired or wireless link, such as a network cable 112. I/O controller 108 also connects to user I/O devices 114 such as a keyboard, a display device, a mouse, or a printer through wired or wireless link 116, such as cables or a radio-frequency connection. System interconnect 118 connects processor 104, RAM 102, storage 106, and I/O controller 108.

Within RAM 102, data processing system 100 stores several items of data and instructions while operating in accordance with a preferred embodiment of the present invention. These programs include applications 128 and an operating system 130, which contains a kernel 134. Within kernel 134, queue recovery service 136 provides queue verification and repair services, which are important recovery operations, on a single-threaded queue 132. Queue recovery service 136 interacts with a queue verify/repair input structure 142 and a queue repair output data structure 144 in an Output Data Area (ODA) buffer 146. The recovery infrastructure of kernel 134 provides a queue verification and repair service in qeue recovery service 136 to assist components in verifying and repairing single-threaded queue 132. Kernel 134 contains an element checker routine 138.

Queue recovery service 136 is initiated by calling a queue_repair( ) command using an example syntax with parameters follows:

```
Syntax :
kerrno_t
queue_repair(
    struct qvrin *qvrin,
    struct qrout *qrout);
```

Parameters:

qvrin—address of a queue verify/repair input structure qrout—address of a queue repair output structure Queue recovery service 136 examines single-threaded queue 132. Queue recovery service 136 detects and repairs errors in single-threaded queue 132. A device driver or routine within kernel 134 calling queue recovery service 136 (hereafter a caller) is required to provide serialization of single-threaded queue 132 prior to calling queue recovery service utility 136. Several output codes indicate whether queue_repair( ) function of queue recovery service 136 successfully completed a queue verify and repair operation. Note that, even when queue errors are detected or corrected, completion is still considered successful. A "QR_NO_ERRORS" message indicates that qeue recovery service 136 completed processing, and no queue errors in single-threaded queue 132 were detected. A "QR_BAD_DATA" message indicates that queue recovery service 136 completed processing and elements with bad data were removed from single-threaded queue 132. A "QR_QUEUE_DAMAGE" message indicates that queue recovery service 136 completed processing, and there was damage to the queue structure of single-threaded queue 132, such that an indeterminate number of elements were removed from single-threaded queue 132. Elements verified as having bad data were also removed from single-threaded queue 132.

On failure, queue recovery service 136 returns a negative value message. A "EINVAL_QR_INVALID_PARMS" message indicates that queue recovery service 136 did not execute and that queue repair of single-threaded queue 132 did not occur, implying that the caller provided invalid input parameter data. An "EINVAL_QR_ELEMCHKR_RETCODE" message indicates that queue recovery service 136 encountered an undefined return code returned to queue_repair( ) by the element checker routine 138 of kernel 134.

The queue_repair( ) service of queue recovery service 136 requires a number of input data values from the caller. The input data is passed via pointer to a queue verify/repair input structure 142. Queue verify/repair input structure 142 contains information about the queue structure of single-threaded queue 132, which an element checker routine 138 uses to verify elements of single-threaded queue 132, and other information. The queue structure information for single-threaded queue 132 includes the type of queue (single or double threaded, with or without a trailer), offset into the queue element of the forward and backward links of single-threaded queue 132, end of queue values for forward and backward links of single-threaded queue 132, and a no-element on queue value for header and trailer of single-threaded queue 132. A sample queue verify/repair input structure 142 follows:

```
typedef    struct qvrin
{
        int eyec;                                       /* eyecatcher */
#define    QVRIN_EYEC 0x5156524E                        /* "QVRN" */
        unsigned short version;                         /* version of input structure */
        char queue_type;
#define    QVRIN_SINGLE              1                  /* single link with header */
#define    QVRIN_SINGLE_TRAILER      2                  /* single link with header and trailer */
#define    QVRIN_DOUBLE              3                  /* double link with header and trailer */
#define    QVRIN_DOUBLE_NO_TRAILER   4                  /* double link with header but no
trailer*/
        ras_element_checker_t element_checker;          /* function pointer to
                                                         * element checker routine */
        int errchk_level;                               /* element checker error checking level.
```

```
                                            * This value is passed through to the
                                            * element checker. */
         void *no_element;                  /* value in queue header or trailer that
                                            * indicates no element on the queue */
         void **header;                     /* address of queue header */
         void *flink_eoq;                   /* forward link end of queue value.
                                            * This value in forward link indicates
                                            * last element on the queue */
         int flink_offset;                  /* offset into element containing the
                                            * forward link */
         void **trailer;                    /* address of queue trailer */
         void *blink_eoq;                   /* backward link end of queue value.
                                            * This value in backward link indicates
                                            * first element on the queue. */
         int blink_offset;                  /* offset into element containing the
                                              backward link */
         void *token;                       /* token value passed through to element
                                            * checker function */
         /* end of QVRIN_VERSION_1 fields */
} qvrin_t;
#define  QVRIN_VERSION_1 0x0001
```

Queue recovery service 136 returns information about its operation in a queue repair output structure 144. A pointer to queue repair output structure 144 is passed as a parameter to the queue repair service of Queue recovery service 136. The caller must set the eyecatcher field (eyec), the version of queue verify/repair input structure 142 (in_version), the address of the output data area (oda) containing queue repair output structure 144, and the size of the output data area (oda_size) containing queue repair output structure 144. The queue repair service of Queue recovery service 136 returns the output data in the remaining fields of queue repair output structure 144. The version of queue repair output structure 144 is returned in out_version. The use of in_version and out_version fields allow for compatible extensions to queue repair output structure 144 if required in the future without requiring all callers of the service to recompile. An example of queue repair output structure 144 follows:

queue repair output structure 144 is useful diagnostic data that could be included in a dump by kernel 134. If there is too much queue data to include in a dump by kernel 134, the output data provided in queue repair output structure 144 is useful in finding areas of RAM 102 where errors occurred to include in dump by kernel 134.

The caller specifies an ODA buffer 146 by using the oda and oda_size fields in queue repair output structure 144. The caller specifies the address and size of ODA buffer 146 in the oda and oda_size fields, respectively. The queue repair service of Queue recovery service 136 places a queue repair output data area header at the beginning of queue repair output structure 144 in ODA buffer 146 (qvoda_hdr_t). Queue repair output structure 144 is then filled with queue repair output data area records (qvoda_record_t). Each qvoda_record_t contains a couple of error codes that describe the

```
typedef  struct qrout
{
         int eyec;
#define  QROUT_EYEC 0x51524F54    /* "QROT" */
         unsigned short in_version;        /* version of qrout structure provided
                                           * by the caller */
         unsigned short out_version;       /* version of qrout structure returned
                                             by the queue_repair( ) service */
         void *oda;                        /* address of output data area buffer */
         size_t oda_size;                  /* size of output data area buffer */
         size_t good_elements;             /* number of good elements remaining
                                             on the queue */
         size_t detected_errors;           /* number of detected errors */
         size_t recorded_errors;           /* number of errors recorded in the
                                           * output data area */
         /* end of QROUT_VERSION_1 fields */
} qrout_t;
#define  QROUT_VERSION_1 0x0001
```

The queue repair service of queue recovery service 136 provides support for an optional Output Data Area (ODA) buffer 146 provided by the caller. ODA buffer 146 can be used by the caller within to receive information about errors that were found during the queue verification and repair operation of queue recovery service 136. The output data provided in type of error that was found and addresses relating to the type of the error.

The queue repair ODA header and ODA records each have a size field in them. This allows compatible extensions to these records in the future. An applicable ODA buffer 146 is described by the following code:

```
typedef   struct qroda_hdr                           /* queue repair output data area header
*/
{
          int qroda_eyec;
#define   QRODA_HDR_EYEC 0x511524F44                 /* "QROD" */
          unsigned short qroda_hdr_version;
          unsigned short qroda_hdr_size;             /* size of the qroda header.
                                                      * also the offset from the start of the
                                                      * buffer to the first record in the
                                                      * output data buffer */
          unsigned int qroda_used;                   /* number of bytes used in the ODA buffer
                                                      * including the header */
          int _rsvd;                                 /* pad structure to 8 byte multiple */
} qroda_hdr_t;
#define   QRODA_HDR_VERSION_1 1
typedef   struct qroda_record                        /* queue repair ODA error record */
{
          unsigned char qrrcd_code;                  /* error code denoting type of record */
          unsigned char qrrcd_extended_code;            /* extended error code */
          unsigned short qrrcd_size;                 /* size of this record */
          int _rsvd;                                 /* align to 8 byte boundary */
          void *qrrcd_addr1;                         /* variable data address 1 */
          void *qrrcd_addr2;                         /* variable data address 2 */
          void *qrrcd_addr3;                         /* variable data address 3 */
} qroda_record_t;
/*
 * Values for qrrcd_code field
 */
#define   QRRCD_CODE_DATA                      4     /* queue element with bad data not
related
                                                      * to links has been removed from queue
*/
#define   QRRCD_CODE_HEADER                    8     /* queue header contains bad address */
#define   QRRCD_CODE_TRAILER                  12     /* queue trailer contains bad address */
#define   QRRCD_CODE_FLINK                    16     /* forward link has bad address */
#define   QRRCD_CODE_BLINK                    20     /* backward link has badd address */
/*
 * Values for qrrcd_extended_code field
 */
#define   QRRCD_EXCODE_DATA                    4     /* queue element has bad data */
#define   QRRCD_EXCODE_LINK                    8     /* queue link contains bad addresss */
*/
#define   QRRCD_EXCODE_CIRCULAR               12     /* queue is circular */
#define   QRRCD_EXCODE_SEQUENCE               16     /* combined name for next two values
*/
#define   QRRCD_EXCODE_BACKWARD_PREVIOUS 16          /* on backward scan, the flink of
                                                      * the previous element does not
                                                      * point to current element */
#define   QRRCD_EXCODE_FORWARD_NEXT      16          /* on forward scan, the blink of
the
                                                      * next element does not point to
                                                      * the current element */
#define   QRRCD_EXCODE_END                    20     /* combined name for next two values
*/
#define   QRRCD_EXCODE_LAST_FORWARD           20     /* forward link of last element does
                                                      * not contain end of queue value */
#define   QRRCD_EXCODE_FIRST_BACKWARD    20          /* backward link of the first element
                                                      * does not contain end of queue
                                                      * value */
```

The following table describes the contents of the three address words in the ODA error record of ODA buffer 146 for the various error codes.

| Code | Addr1 | Addr2 | Addr3 |
|---|---|---|---|
| 4 (bad data) | Element removed from queue | Previous element | Next element |
| 8 (bad header) | Address of bad queue header | Invalid header contents | Recovered header contents |
| 12 (bad trailer) | Address of bad queue trailer | Invalid trailer contents | Recovered trailer contents |
| 16 (bad flink) | Element with bad flink | Invalid flink contents | Recovered flink contents |
| 20 (bad blink) | Element with bad blink | Invalid blink contents | Recovered blink contents |

Queue_repair( ) service 136 utilizes an element checker routine 138. The caller provides a function pointer to element checker routine 138. Queue repair service 136 examine single-threaded queue 132 and calls element checker routine 138 for the elements on single-threaded queue 132. The element checker routine 138 determines if a purported element of single-threaded queue 132 is a queue element and if it contains good element data. The interface to element checker routine 138 is embodied in the following code:

```
typedef  kerrno_t (*ras_element_checker_t) (
         void *element,              /* element to be verified */
         int errchk_level,           /* error checking level, passthru from
                                      * queue verify and repair caller */
         long flags,                 /* The following 3 flags are
                                      * passed through from the
                                      * raschk_queue_verify( ) caller.
                                      *      RASCHK_VERBOSE_MODE (0x01)
                                      *      RAS_SR_NOFAULT         (0x02)
                                      *      RAS_SR_NOPAGEIN        (0x04)
                                      * All other flags will be zero
                                      * and reserved for future use.
                                      * The flags parm will be 0 from
                                      * queue_repair( ).
                                      */
         void *token,                /* passthru from queue verify and repair
                                      * caller. Used to allow communication
                                      * from queue verify/repair caller to
                                      * element checker. */
         long depth,                 /* Existing checker parameter, value will
                                      * be 0 from queue verify and repair */
         long *status);              /* Existing checker parameter, value will
                                      * be NULL from queue verify and repair
*/
```

Element checker routine 138 is expected to return one of the following return codes:

```
#define ELEMCHKR_VALID_ELEMENT 0      /* element address is a valid
                                       * queue element */
#define EINVAL_ELEMCHKR_BAD_DATA      KERROR (EINVAL, sysras_BLOCK_00, 0xxxx)
                                      /* element address is a queue
                                       * element but the element contains
                                       * some bad data */
#define EINVAL_ELEMCHKR_NOT_ELEMENT   KERROR (EINVAL, sysras_BLOCK_00, 0xxxx)
                                      /* element address is not a
                                       * queue element */
/*
 * All negative kerrno_t return values indicate the element address is
 * not a queue element. An element checker may return the 'not element'
 * return code defined above, or any other negative kerrno_t value
 * including the following return codes from raschk_safe_reads( ):
 *
 *      EFAULT_SAFE_READ_PAGEIN
 *      EFAULT_SAFE_READ_FAULT
 *      EFAULT_SAFE_READ_INVAL
 */
```

Element checker routine 138 can make a number of tests to determine the validity of an element. Element checker routine 138 can determine whether an element address has a correct boundary alignment for a queue element; if queue elements are contained within known ranges, is the element address within one of the ranges; if an eyecatcher is valid in the element; if unused areas in the element are initialized to a known value, if those are areas set correctly; if there are invalid combinations of flag bits set; if enum or coded fields are within range; and if addresses in the element are valid?

Element checker routine 138 does not consider the forward and backward link fields in the element in determining if the element is valid or not. A queue checking routine of queue recovery service 136 will examine and repair those fields if necessary.

The return code from element checker routine 138 determines how queue recovery service 136 routine proceeds. Elements with the 'valid data' return code remain on the queue and their forward and backward links (if present) are used to find other elements on the queue. Elements with the 'bad data' return code will be removed from the queue, but their forward and backward links will be used to find other elements on the queue. Elements with the 'not element' return code will be removed from the queue and their links are not used to find other elements.

If single-threaded queue 132 has been corrupted in a manner such that elements can not be found from the existing queue elements, then those elements that can not be found are lost. Queue recovery service 136 can not find lost elements and add them back to single-threaded queue 132. When queue recovery service 136 finishes its operation, the structure of single-threaded queue 132 will be correct and the elements identified as being good queue elements will be on single-threaded queue 132. Whether or not this recovered queue can be used for continued system operation by kernel 134 must be decided by the queue repair caller within kernel 134.

Queue recovery service 136 can detect and correct the following type of queue errors: Bad forward link in an element; Circular forward link; Header not pointing to an element; Bad backward link in an element; Circular backward link; Trailer not pointing to an element and Elements with bad data.

The queue repair caller within kernel 134 is responsible for serializing single-threaded queue 132. Serialization can be an issue for a single-threaded queue 132 manipulated with atomic operations. One approach to verifying and repairing a single-threaded queue 132 manipulated with atomic operations is to 'steal' single-threaded queue 132 (remove the entire queue from its anchor) and to verify/repair the stolen single-threaded queue 132, being sure to add the stolen single-threaded queue 132 back to its anchor after repairing it.

Queue recovery service 136 on a single-threaded queue starts by verifying the header element of the single-threaded queue 132 identified in the queue verify/repair input structure 142. The single-threaded queue 132 is then scanned in the forward direction. If the end of single-threaded queue 132 is reached during the scan without any errors, the queue recovery service 136 processing is complete. Circularity checks using the T/H algorithm are made by the queue recovery service 136 during the forward scan and the scan is terminated if circularity is detected. If circularity is detected, the queue is repaired by the queue_repair( ) service 136 with all the found and valid queue elements utilizing information obtained from the T/H algorithm and the algorithm described by the present invention.

To understand the present invention, consider the following single-threaded queue 132:

A->B->C->D->E->F->G->H->I->J->K->I->J->K->I and so on.
1  2  3  4  5  6  7  8  9 10 11 12 13 14 15 and so on.

The exemplary single-threaded queue 132 contains a 3 element cycle at the end (elements I, J, and K). Element K is the element which has the bad forward link and is the element causing the cycle.

Queue verification and repair by queue recovery service 136 starts by using a T/H algorithm against the queue. This T/H algorithm will eventually reach the point where the tortoise and hare pointers point to the same queue element. In the example single-threaded queue 132, this is either the I, J, or K element. When this alignment happens, Queue recovery service 136 has identified a cycle. However, queue recovery service 136, having identified the existence of the cycle and one element within the cycle, needs to identify the number of elements in the cycle and the element causing the cycle.

For queue recovery purposes, element K needs to be located by Queue recovery service 136 in the above example. The method that queue recovery service 136 uses to perform this identification is embodied in the following paragraphs.

Queue recovery service 136 uses the pointer to an element in the cycle and that element's position in the queue from the start of the queue provided by T/H algorithm. For example, assuming element J at position 10 was found, starting at this element, queue recovery service 136 determines the number of elements in the cycle. This is easily done by running the forward links from element J until we return to element J.

Queue recovery service 136 then locates the elements that are 'cycle count' elements before the T/H element. This gives us a queue element that is outside the cycle. In the preceeding example, backing up 3 elements before the T/H element (J position t0), Queue recovery service 136 denotes element G in position 7. (10−3=7). A scan of single-threaded queue 132 from the beginning is needed to locate element 7 (G). If backing up 'cycle count' elements from T/H element yields a negative number, then Queue recovery service 136 starts the scan at the beginning of single-threaded queue 132.

Queue recovery service 136 then scans every element from the element located in the preceding paragraph. In the previously-provided example, elements H, I, J, K, will each cause a scan from G to occur to check for circularity. None of these scans will detect element circularity. When element I is reached the second time it will have a position of 12. The scan from G will find H and then 1. However, when scanned from G, element I has a position count of 9, when reached from element K it has a position count of 12. This mismatch allows the algorithm to detect that element K (the 'previous' element from I) is the element which caused the list cycle.

Once queue recovery service 136 finds the element causing the list cycle, single-threaded queue 132 is recovered by storing an 'end of queue' value into its link field.

Figure 2:
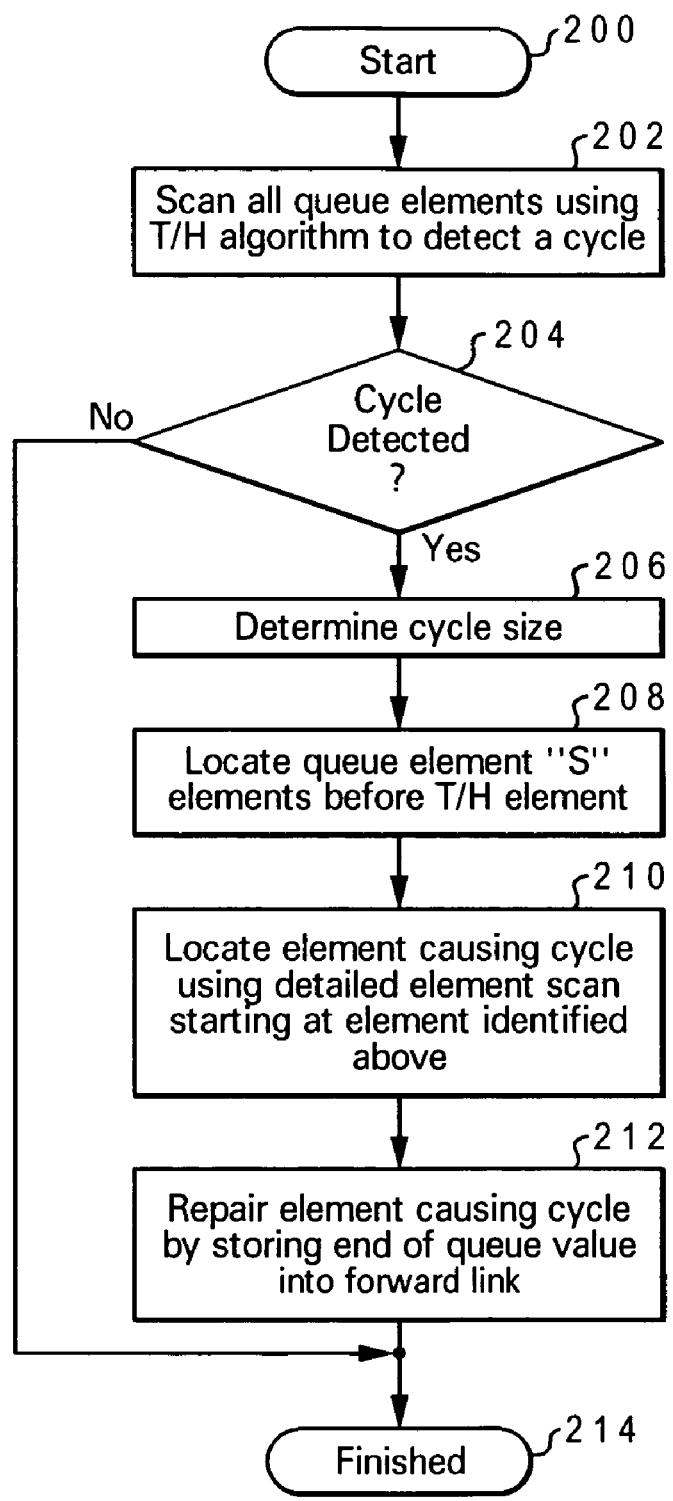
FIG. 2 is a high-level logical flowchart of a process for performing efficient recovery of a single-threaded queue in accordance with a preferred embodiment of the present invention.

Turning now to FIG. 2, a high-level logical flowchart of a process for performing efficient recovery of a single-threaded queue is depicted. The process starts at step 200 and then proceeds to step 202, which depicts queue recovery service 136 scanning all elements of single-threaded queue 132 to detect a cycle. The process next moves to step 204. Step 204 illustrates queue recovery service 136 determining whether a cycle was detected in single-threaded queue 132. If queue recovery service 136 determines that no cycle was detected in single-threaded queue 132, then the process ends at step 214. If queue recovery service 136 determines that a cycle was detected in single-threaded queue 132, then the process next moves to step 206, which depicts queue recovery service 136 determining cycle size.

The process then proceeds to step 208. Step 208 illustrates queue recovery service 136 locating an element in single-threaded queue 132 that is a number of queue elements prior to the start of the cycling element equivalent to the cycle size. The process next moves to step 210. Step 210 depicts queue recovery service 136 locating the element causing the cycle using a detailed element scan starting at the element identified in step 208. The process next proceeds to step 212, which depicts queue recovery service 136 repairing the element causing the cycle by storing an 'end of queue' value in the forward link of the element causing the cycle. The process then ends at step 214.

The present invention efficiently detects a cycle in a single threaded queue, locates the element causing the cycle, and repairs the queue by storing an end of queue value into the forward link of the element causing the cycle. Unlike the prior art's technique to 'scan from the beginning of the queue' for every element, which becomes inefficient when there are large numbers of elements on the queue, the present invention provides much faster results. A test on a queue of 50,000 elements with a 500 element cycle required 44.3 seconds of CPU time to perform the detailed element scan algorithm of the prior art. Most of this CPU time was consumed scanning the queue from the beginning. This present invention took less than 0.1 seconds to verify and correct the same queue.

The amount of CPU time saved by the present invention compared to the prior art increases as queue length increases. The present invention's performance value decreases as the size of the cycle increases. However, the present invention does not deteriorate to a condition worse than that of the prior art for any parameters. The present invention also performs well in the expected queue verify and repair situation where there is no cycle in the list While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs.

What is claimed is:

1. A method for performing recovery of a single-threaded queue, said method comprising:

scanning a set of elements of said single-threaded queue to detect a cycle containing a first element;

in response to detecting said cycle, determining a size of said cycle in terms of a number of elements contained in said cycle;

locating a second element of said set of elements of said single-threaded queue that is previous to said first element by a number of elements equivalent to said cycle;

identifying an element causing said cycle by performing a detailed element scan starting at said second element; and recovering said single-threaded queue by storing an end-of-queue value in a forward link of said element causing said cycle.

2. The method of claim 1, further comprising writing a result of said recovering step to a queue repair output data structure.

3. The method of claim 1, wherein said step of recovering said single-threaded queue further comprises repairing a bad forward link.

4. The method of claim 1, further comprising the step of verifying the integrity of each element of a queue with an element checker.

5. The method of claim 1, wherein said step of recovering said single-threaded queue further comprises repairing a header not pointing to an element.

6. The method of claim 1, wherein said step of scanning said set of elements of said single-threaded queue to detect said cycle containing said first element further comprises scanning said set of elements of said single-threaded queue using a tortoise and hare algorithm to detect said cycle containing a first element.

7. The method of claim 1, wherein said step of recovering said single-threaded queue further comprises repairing an element holding bad data.

8. A system for performing recovery of a single-threaded queue, said system comprising:

a processor;

a memory coupled to said processor; and a queue recovery utility stored within said memory and executable on said processor for;

scanning a set of elements of said single-threaded queue to detect a cycle containing a first element;

in response to detecting said cycle, determining a size of said cycle in terms of a number of elements contained in said cycle;

locating a second element of said set of elements of said single-threaded queue that is previous to said first element by a number of elements equivalent to said cycle;

identifying an element causing said cycle by performing a detailed element scan starting at said second element; and recovering said single-threaded queue by storing an end-of-queue value in a forward link of said element causing said cycle.

9. The system of claim 8, further comprising executable code for writing a result of said recovering step to a queue repair output data structure.

10. The system of claim 8, wherein said executable code for recovering said single-threaded queue further comprises executable code for repairing a bad forward link.

11. The system of claim 8, further comprising executable code for verifying the integrity of each element of a queue with an element checker.

12. The system of claim 8, wherein said executable code for recovering said single-threaded queue further comprises executable code for repairing a header not pointing to an element.

13. The system of claim 8, wherein said executable code for scanning said set of elements of said single-threaded queue to detect said cycle containing said first element further comprises executable code for scanning said set of elements of said single-threaded queue using a tortoise and hare algorithm to detect said cycle containing a first element.

14. The system of claim 8, wherein said executable code for recovering said single-threaded queue further comprises executable code for repairing an element holding bad data.

15. A computer program product comprising a signal bearing storage medium having a plurality of instructions processable by a processor, wherein said plurality of instructions, when processed by said processor, causes said processor to perform a method, said method comprising:

scanning a set of elements of said single-threaded queue to detect a cycle containing a first element;

in response to detecting said cycle, determining a size of said cycle in terms of a number of elements contained in said cycle;

locating a second element of said set of elements of said single-threaded queue that is previous to said first element by a number of elements equivalent to said cycle;

identifying an element causing said cycle by performing a detailed element scan starting at said second element; and recovering said single-threaded queue by storing an end-of-queue value in a forward link of said element causing said cycle.

16. The computer program product of claim 15, said method further comprising writing a result of said recovering step to a queue repair output data structure.

17. The computer program product of claim 15, wherein said step of recovering said single-threaded queue further comprises repairing a bad forward link.

18. The computer program product of claim 15, said method further comprising verifying the integrity of each element of a queue with an element checker.

19. The computer pro gram product of claim 15, wherein said step of recovering said single-threaded queue further comprises repairing a header not pointing to an element.

20. The computer pro gram product of claim 15, wherein said step of scanning said set of elements of said single-threaded queue to detect said cycle containing said first element further comprises scanning said set of elements of said single-threaded queue using a tortoise and hare algorithm to detect said cycle containing a first element.

* * * * *